United States Patent

Nunome et al.

(10) Patent No.: US 8,048,560 B2
(45) Date of Patent: Nov. 1, 2011

(54) ALKALINE BATTERY

(75) Inventors: Jun Nunome, Kyoto (JP); Fumio Kato, Osaka (JP); Harunari Shimamura, Osaka (JP)

(73) Assignee: Panasonic Corporation, Osaka (JP)

( * ) Notice: Subject to any disclaimer, the term of this patent is extended or adjusted under 35 U.S.C. 154(b) by 545 days.

(21) Appl. No.: 12/342,183

(22) Filed: Dec. 23, 2008

(65) Prior Publication Data

US 2009/0197169 A1    Aug. 6, 2009

Related U.S. Application Data

(60) Provisional application No. 61/018,569, filed on Jan. 2, 2008.

(30) Foreign Application Priority Data

Dec. 28, 2007 (JP) ................................. 2007-340742
Apr. 30, 2008 (JP) ................................. 2008-118842
Oct. 8, 2008 (JP) ................................. 2008-261570

(51) Int. Cl.
*H01M 6/04*    (2006.01)

(52) U.S. Cl. ..... 429/207; 429/206; 429/209; 429/218.1; 429/224; 429/229

(58) Field of Classification Search ........................ None
See application file for complete search history.

(56) References Cited

U.S. PATENT DOCUMENTS

| 6,214,198 | B1 | 4/2001 | Anderson et al. | |
| 6,527,941 | B2 | 3/2003 | Anderson et al. | |
| 6,638,401 | B1 | 10/2003 | Anderson et al. | |
| 2005/0233215 | A1* | 10/2005 | Yamaguchi et al. | 429/224 |

FOREIGN PATENT DOCUMENTS

| JP | 63-020495 | 1/1988 |
| JP | 07-166386 | 6/1995 |
| JP | 2002-533288 | 10/2002 |
| JP | 2004-186127 | 7/2004 |
| JP | 2005-520290 | 7/2005 |
| WO | WO 00/37714 | 6/2000 |
| WO | WO 03/077330 A2 | 9/2003 |

OTHER PUBLICATIONS

Ruetschi, Paul et al., "Cation Vacancies in MnO2 and Their Influence on Electrochemical Reactivity," J. Electrochem, Soc. vol. 135, No. 11, pp. 2663-2669.

Nagaishi, Tsuyoshi et al., "Electrolysis condition and various characteristics of electrolytic manganese dioxide suitable for high rate discharge performance," The 44th Battery Symposium pp. 656-657.

Japanese Notification of Reasons for Refusal issued in Japanese Patent Application No. 2008-118842, dated Aug. 7, 2008.

* cited by examiner

*Primary Examiner* — Helen O Conley
*Assistant Examiner* — Wyatt McConnell
(74) *Attorney, Agent, or Firm* — McDermott Will & Emery LLP

(57) ABSTRACT

An alkaline battery comprising a positive electrode, a negative electrode, a separator disposed between the positive electrode and the negative electrode; and an alkaline electrolyte, wherein the positive electrode includes manganese dioxide and graphite; the cumulative pore volume of pores with diameters of 3 to 5 nm in the manganese dioxide is X ($cm^3/g$), and the weight loss rate of the manganese dioxide when heated from 150 to 400° C. is Y (%), X and Y satisfying $0.005 \leq X \leq 0.011$, $3.4 \leq Y \leq 3.9$, and $-16.7X+3.58 \leq Y \leq 66.7X+3.17$; the negative electrode includes zinc; and the alkaline electrolyte includes an aqueous potassium hydroxide solution.

3 Claims, 4 Drawing Sheets

ALKALINE BATTERY

RELATED APPLICATIONS

This application claims the priority to JP 2007-340742, filed on Dec. 28, 2007, JP 2008-118842, filed on Apr. 30, 2008, JP 2008-261570, filed on Oct. 8, 2008 and to U.S. Provisional Application No. 61/018,569, filed on Jan. 2, 2008, all of which are incorporated herein by reference.

FIELD OF THE INVENTION

The present invention relates to alkaline batteries, and particularly relates to improvements in manganese dioxide included in a positive electrode for alkaline batteries.

BACKGROUND OF THE INVENTION

In recent years, alkaline batteries have been expected to have improved discharge performance in an entire range of load from light load to heavy load, and in particular, the improvement in discharge performance in an intermediate load has been demanded. The main application corresponding to discharge under a heavy load is digital still cameras, and the main application corresponding to discharge under an intermediate load is portable music devices. It is difficult, however, to improve the discharge performance in the intermediate load (i.e., in AA-size batteries, current of about 0.1 to 0.4 A), and there has been a demand for a technique for improving the intermediate load discharge performance without degrading the discharge performance in the other range of load.

Manganese dioxide included in a positive electrode for alkaline batteries contains structural water (or water of crystallization) in the crystal structure thereof. Conventionally, in view of improving heavy load discharge performance, the use of manganese dioxide containing an increased amount of structural water has been proposed.

For example, Patent Document 1 proposes the use of manganese dioxide having a weight loss rate when heated from 200 to 400° C. of 2.7% or more. In such manganese dioxide, the weight loss rate when heated from 150 to 400° C. is estimated to be 3.2% or more.

Non-patent Document 1 proposes that the synthesis conditions for manganese dioxide be controlled to change the crystal structure of the manganese dioxide, thereby to improve the heavy load discharge performance.

Non-patent Document 2 discloses that the weight loss rate from 150 to about 400° C. reflects the amount of Mn vacancies in the solid phase of manganese dioxide. When there is a large amount of Mn vacancies, the migration of hydrogen ions in the solid phase of manganese dioxide is facilitated. Accordingly, it is assumed that when a large amount of current flows, the polarization during discharge is reduced, resulting in a good discharge performance. On this assumption, the synthesis conditions under which the Mn vacancies are increased are examined.

Patent Document 2 proposes that in an alkaline zinc battery, in view of improving the characteristics when the battery is continuously discharged at 1 A, the pore volume in the manganese dioxide be 0.035 $cm^3/g$ to 0.050 $cm^3/g$.

Patent Document 3 proposes a method for preparing manganese dioxide suited for heavy load discharge, by way of controlling the electrolytic synthesis conditions.

Patent Document 1: Japanese Laid-Open Patent Publication No. 2004-186127

Patent Document 2: Japanese Laid-Open Patent Publication (Translation of PCT Application) No. 2005-520390

Patent Document 3: Japanese Laid-Open Patent Publication (Translation of PCT Application) No. 2002-533288

Non-patent Document 1: Collection of 44th Battery Symposium Lecture Summaries, pp. 656-657

Non-patent Document 2: Paul Reutschi et al., J. Electrochem. Soc., Vol. 135, No. 11 (1988), pp. 2663-2669

However, sufficient improvement of both heavy load discharge performance and intermediate discharge performance cannot be achieved by merely increasing the structural water in manganese dioxide as conventionally proposed. In order to achieve further improvement of both heavy load discharge performance and intermediate discharge performance of alkaline batteries, it is considered necessary to control not only the content of structural water but also the relationship between the content of structural water and other physical properties of manganese dioxide.

BRIEF SUMMARY OF THE INVENTION

The present invention relates to an alkaline battery comprising a positive electrode, a negative electrode, a separator disposed between the positive electrode and the negative electrode; and an alkaline electrolyte, wherein the positive electrode includes manganese dioxide and graphite; the cumulative pore volume of pores with diameters of 3 to 5 nm in the manganese dioxide is X ($cm^3/g$), and the weight loss rate of the manganese dioxide when heated from 150 to 400° C. is Y (%), X and Y satisfying $0.005 \leq X \leq 0.011$, $3.4 \leq Y \leq 3.9$, and $-16.7X+3.58 \leq Y \leq 66.7X+3.17$; the negative electrode includes zinc; and the alkaline electrolyte includes an aqueous potassium hydroxide solution.

The present invention is particularly effective in an AA-size alkaline battery. According to the present invention, it is possible to provide an AA-size alkaline battery, wherein when the alkaline battery is subjected to an operation, for example, of performing a pattern discharge continuously for 10 cycles followed by an interval for 55 minutes, the pattern discharge comprising a discharge at 1.2 A for 2 seconds and a subsequent discharge at 0.5 A for 28 seconds, and the operation is repeated until the battery voltage reaches 1.05 V, the number of cycles of the pattern discharge is 130 cycles or more.

Moreover, according to the present invention, it is possible to provide an AA-size alkaline battery, wherein when the alkaline battery is subjected to an operation of performing a discharge at 0.25 A for 1 hour followed by an interval for 23 hours, and the operation is repeated until the battery voltage reaches 0.9 V, the total discharge duration is 9.2 hours or longer. In other words, after having been subjected to an operation of performing a discharge at 0.25 A for 1 hour followed by an interval for 23 hours, the operation being repeated 9 times in total, the AA-size battery of the present invention can be further discharged at 0.25 A for 0.2 hours or longer. From this feature, users of the battery of the present invention would feel and realize a dramatic increase in performance. It has been conventionally acknowledged that when intermittent discharge as described above is repeatedly performed, the discharge is disabled in the middle of the 9th discharge, and the longest possible total discharge duration is 9 hours.

The alkaline battery of the present invention can be produced, for example, by a method comprising the steps of: (i) obtaining a manganese dioxide by electrolysis in an electrolytic bath containing sulfuric acid and manganese sulfate, the manganese dioxide having a cumulative pore volume of pores with diameters of 3 to 5 nm of X (cm$^3$/g) and a weight loss rate when heated from 150 to 400° C. of Y (%), X and Y satisfying $0.005 \leq X \leq 0.011$, $3.4 \leq Y \leq 3.9$, and $-16.7X+3.58 \leq Y \leq 66.7X+3.17$; (ii) preparing a positive electrode material mixture containing the manganese dioxide and graphite, and forming the positive electrode material mixture into a hollow cylindrical shape to give a positive electrode, (iii) obtaining a gelled negative electrode containing zinc, and (iv) inserting the positive electrode into a bottomed battery case having an opening, filling the hollow of the positive electrode with the negative electrode with a separator interposed therebetween, and sealing the opening of the battery case.

It is preferable that the step (i) is controlled such that the concentration of sulfuric acid in the electrolytic bath at the end of the electrolysis is higher than that at the start of the electrolysis.

For example, the concentration of hydrogen ions in the electrolytic bath is preferably increased at a rate of 0.2 to 1% per 1 hour throughout the electrolysis from the start to the end.

The concentration of hydrogen ions can be varied by supplying an aqueous solution containing sulfuric acid and manganese sulfate into the electrolytic bath at a predetermined rate.

It is further preferable that the step (i) comprises the sub-steps of: (a) a first electrolysis performed by setting a current density at A1 at the start of electrolysis and performing electrolysis for a period of time of T1, (b) a second electrolysis performed by setting a current density at A2 being higher than A1 after the first electrolysis and performing electrolysis for a period of time of T2, and (c) a third electrolysis performed by setting a current density at A3 being higher than A2 after the second electrolysis and performing electrolysis for a period of time of T3.

According to the present invention, it is possible to provide an alkaline battery having both improved heavy load discharge performance and improved intermediate load discharge performance over conventional alkaline batteries. Here, the heavy load discharge performance particularly means intermittent pulse discharge performance; and the intermediate load discharge performance particularly means intermediate-load intermittent discharge performance. The effect of the present invention is noticeable in terms of intermittent pulse discharge performance and intermediate-load intermittent discharge performance.

The intermittent pulse discharge is a discharge that supplies power required for flash exposure by digital still cameras, and the like, and has different features from the conventional heavy load continuous discharge. For example, in an intermittent pulse discharge, a voltage drop is more likely to occur at higher depth of discharge due to the influence of polarization resistance. This is because, unlike in a heavy load continuous discharge, the polarization is not reduced in the final stage of discharge. In the case of heavy load continuous discharge, Joule heat is accumulated in the inside of the battery in the middle and later stages of discharge, thereby raising the temperature in the inside of the battery. This raise in temperature serves to reduce the concentration polarization in the final stage of discharge. In contrast, in the case of intermittent pulse discharge, because of the presence of intervals between discharge terms, Joule heat is unlikely to be accumulated in the inside of the battery, and the polarization is not reduced. As such, the influence of polarization resistance tends to be more noticeable.

The intermediate-load intermittent discharge is a discharge that supplies power particularly required for portable music devices, and the like, in which an AA-size battery is intermittently discharged under an intermediate load, for example, at a current value of about 0.1 to 0.4 A. In such an application, the AA-size battery is used until the depth of discharge becomes so high that the reaction utilization rate of manganese dioxide exceeds 72%. This results in an increased polarization resistance due to discharge.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

An alkaline battery having excellent discharge performance both in heavy load discharge and in intermediate load discharge can be obtained by controlling the cumulative pore volume X (cm$^3$/g) of pores with diameters of 3 to 5 nm in manganese dioxide and the weight loss rate Y (%) of manganese dioxide when heated from 150 to 400° C. within a suitable range.

In order to reduce the polarization and improve the discharge performance both during heavy load discharge and during intermediate load discharge, it is effective to maintain the weight loss rate Y (%) of manganese dioxide when heated from 150 to 400° C. at 3.4% or more and 3.9% or less as well as to control the cumulative pore volume X (cm$^3$/g) of pores with diameters of 3 to 5 nm in manganese dioxide to 0.005 cm$^3$/g or more and 0.011 cm$^3$/g or less.

Conventionally, as the synthesis conditions for electrolytic manganese dioxide, it has been considered effective to employ synthesis conditions under which the Mn vacancies are increased, that is, synthesis conditions under which the weight loss rate from 150 to 400° C. is increased. Under this circumstance, electrolytic manganese dioxide has been produced with an increased current density, a higher acid concentration, or a lower electrolysis temperature, or a combination of these, and the electrolytic manganese dioxide thus produced has been used in a positive electrode for alkaline batteries. It has been impossible, however, to sufficiently improve the discharge performance both in heavy load discharge and in intermediate load discharge. This is because the heavy load discharge performance and the intermediate load discharge performance are greatly affected not only by the amount of Mn vacancies but also by the cumulative pore volume of pores with diameters of 3 to 5 nm.

Electrolytic manganese dioxide is composed of acicular crystallites. Each acicular crystallite has a size of about several tens to several hundreds of nm in length and several tens of nm in thickness (diameter). The gaps between such acicular crystallites are considered to be equivalent to the cumulative pore volume of pores with diameters of 3 to 5 nm. Here, as shown in FIGS. 1A and 1B, the cumulative pore volume of pores with diameters of 3 to 5 nm is considered to reflect the size of acicular crystallites.

Figure 1A:
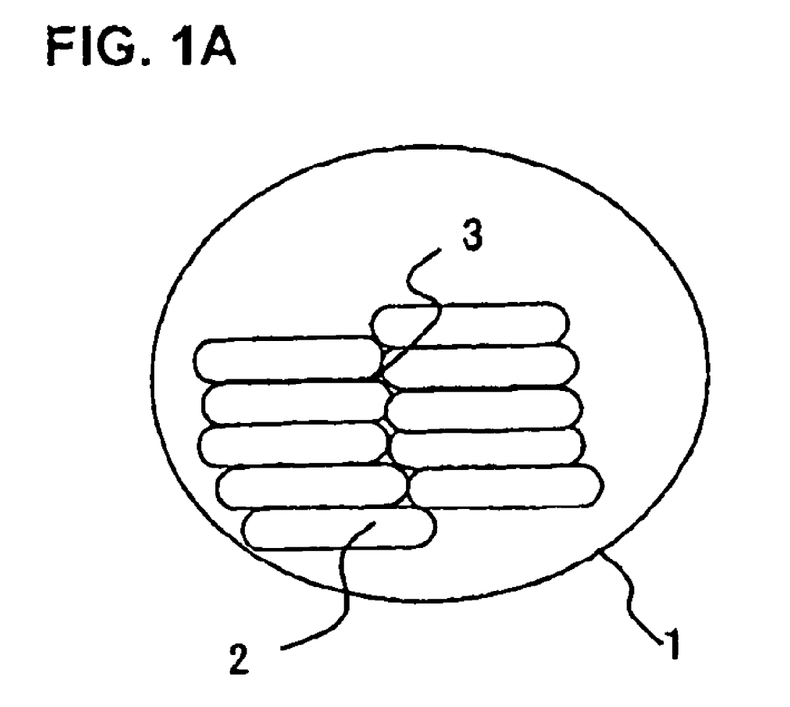
FIG. 1A is a schematic representation explaining the relationship between crystallites of manganese dioxide and gaps therebetween.
Figure 1B:
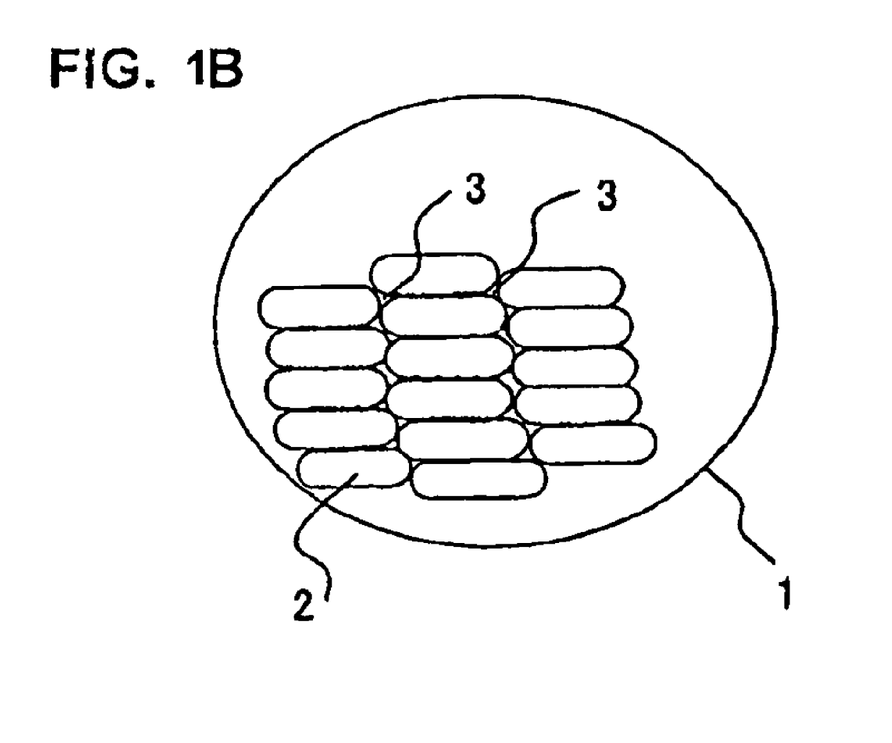
FIG. 1B is another schematic representation explaining the relationship between crystallites of manganese dioxide and gaps therebetween.

As shown in FIG. 1A, when the size of crystallites 2 constituting an electrolytic manganese dioxide particle 1 is large, the amount of pores 3 having a diameter of 3 to 5 nm is reduced and the cumulative pore volume thereof becomes small. On the other hand, as shown in FIG. 1B, when the size of the crystallites 2 constituting the electrolytic manganese dioxide particle 1 is small, the amount of the pores 3 having a diameter of 3 to 5 nm is increased and the cumulative pore volume thereof becomes large.

As described above, the cumulative pore volume of pores with diameters of 3 to 5 nm can serve as an index representing the crystallinity of manganese dioxide. It has been reported, for example, that the crystallinity of manganese dioxide is reflected by the half width of a peak attributed to Miller indices obtained by X-ray powder diffractometry, specifically, a peak attributed to (110) plane. It is difficult, however, to use this half width as an accurate index to understand the state of crystallites because the half width is varied depending also on the amount of Mn vacancies. On the other hand, the cumulative pore volume of pores with diameters of 3 to 5 nm more accurately reflects the state of crystallites.

The cumulative pore volume of pores with diameters of 3 to 5 nm is considered to affect the discharge performance in the following mechanism. During the discharge of manganese dioxide, the crystals thereof expand and the gaps between the crystallites increase, thus presumably causing the dissociation of aggregation, and the like. If such a phenomenon occurs, the electronic conductivity between crystallites deteriorates, and moreover the ionic conductivity in the gaps between crystallites becomes unfavorable. This increases the polarization during discharge, and the discharge performance deteriorates. In particular, during heavy load discharge, since the current value is high even when the reaction utilization rate of manganese dioxide is not so high, around 20 to 30%, a great voltage drop due to polarization resistance occurs, resulting in a significant deterioration of the discharge performance.

Even in the case of manganese dioxide in which the Mn vacancies are increased, when the cumulative pore volume of pores with diameters of 3 to 5 nm is large, because of the small size of crystallites, the electron conductivity between crystallites and the ionic conductivity in the gaps between crystallites are reduced significantly, failing to provide a sufficiently high discharge performance. In contrast, when the cumulative pore volume of pores with diameters of 3 to 5 nm is small, even with the progress of discharge, the manganese dioxide is unlikely to fall into the unfavorable state as described above, and therefore the discharge performance will not easily deteriorate.

In the case of intermediate load discharge, the reaction utilization rate of manganese dioxide sometimes reaches 72% or higher, and the expansion rate of crystallites of the manganese dioxide increases. When this occurs, it is extremely difficult to secure the electronic conductivity between crystallites and the ionic conductivity in the gaps between crystallites. Consequently, a great voltage drop due to polarization resistance occurs, resulting in a significant deterioration of the discharge performance. However, in the case of using manganese dioxide in which the Mn vacancies are increased and the cumulative pore volume of pores with diameters of 3 to 5 nm is as small as 0.011 g/cm$^3$ or less, even with the progress of discharge, the manganese dioxide is unlikely to fall into the unfavorable state as described above, and therefore the discharge performance will not easily deteriorate.

In short, it is considered that manganese dioxide in which the amount of Mn vacancies, which is reflected by the weight loss rate from 150 to 400° C., is increased and the cumulative pore volume of pores with diameters of 3 to 5 nm is reduced provides an alkaline battery excellent in both heavy load discharge performance and intermediate load discharge performance. Under the conventional synthesis conditions for electrolytic manganese dioxide, however, it is impossible to provide manganese dioxide in which the amount of Mn vacancies and the cumulative pore volume of pores with diameters of 3 to 5 nm are controlled within a suitable range as described above. The reason for this is described below.

The synthesis of electrolytic manganese dioxide is carried out using an electrolytic bath containing manganese sulfate and sulfuric acid. It is known that, in synthesizing electrolytic manganese dioxide, the amount of Mn vacancies and the crystallinity are varied by controlling the concentration of sulfuric acid in the electrolytic bath, the electrolysis temperature, the current density, and the like. The conventional synthesis of electrolytic manganese dioxide, however, is carried out with a constant current value. Moreover, the concentration of sulfuric acid in the electrolytic bath is controlled so as to be almost constant. Although there is a slight variation in the concentration, the variation is so small that it varies irregularly within a range of plus and minus 5% from a predetermined concentration. It never happens that the concentration of sulfuric acid is constantly increased or varied at a stable rate.

In the case of controlling the current value and the concentration of sulfuric acid in the electrolytic bath almost constantly, when the conditions are changed so as to increase the Mn vacancies, the cumulative pore volume of pores with diameters of 3 to 5 nm tends to increase. Conversely, when the conditions are changed so as to decrease the Mn vacancies, the cumulative pore volume of pores with diameters of 3 to 5 nm tends to decrease. For this reason, it is impossible to control both the Mn vacancies and the cumulative pore volume of pores with diameters of 3 to 5 nm within an ideally suitable range. It should be noted that the tendencies as describe above are important findings discovered by the inventors in the process of achieving the present invention. Without such findings, one of ordinary skill would not have been motivated to drastically change the conventional synthesis conditions of electrolytic manganese dioxide.

By contrast, in the case of controlling the concentration of sulfuric acid in the electrolytic bath such that the concentration at the end of electrolysis becomes higher than that at the start of electrolysis, it is possible to synthesize manganese dioxide in which there is a large amount of Mn vacancies and the cumulative pore volume of pores with diameters of 3 to 5 nm is small. For example, it is preferable to constantly increase the concentration of sulfuric acid throughout the electrolysis from the start to the end. The rate of varying the concentration of sulfuric acid is not particularly limited, but it is preferable to increase the concentration of hydrogen ions in the electrolytic bath (concentration of sulfuric acid) at a rate of 0.2 to 1% per 1 hour, and particularly preferable to increase at a rate of 0.3 to 0.5% per 1 hour. The concentration of hydrogen ions can be controlled by, for example, supplying an aqueous solution containing sulfuric acid and manganese sulfate into the electrolytic bath at a predetermined rate. With the progress of electrolysis, the manganese ions and hydrogen ions in the electrolytic bath are consumed. Therefore, the rate of supplying an aqueous solution containing sulfuric acid and manganese sulfate is controlled with the amount of ions to be consumed taken into consideration.

Further, it is effective to control the conditions such that the current density is set small at the start of electrolysis and is gradually increased.

In the following, an example of preferred synthesis conditions for electrolytic manganese dioxide is described.

The concentration of manganese sulfate in the electrolytic bath is, for example, in the range of 20 to 180 g/L; and the temperature of the electrolytic bath during electrolysis is preferably about 95° C.±2° C. First, the current density is set to A1 at the start of electrolysis to perform a first electrolysis for a period of time of T1. Subsequently, the current density is set to A2 to perform a second electrolysis for a period of time of T2. At this time, the current density A2 is set to be larger than A1. For example, A1 and A2 preferably satisfy $2A1 \leq A2$, and more preferably satisfy $5A1 \leq A2$.

Thereafter, the current density is set to A3 to perform a third electrolysis for a period of time of T3. At this time, the current density A3 is set to be larger than A2. For example, A2 and A3 preferably satisfy $2A2 \leq A3$, and more preferably satisfy $5A2 \leq A3$. Subsequent operation to repeatedly perform electrolysis for a predetermined period of time with gradually increased current densities may be performed. It is effective, however, to perform the first and second electrolysis with a short period of time and then continuously perform the third electrolysis at a constant current density.

The stepwise electrolysis as described above allows the reaction to proceed slowly at the initial stage of electrolysis, that is, the crystals to growth steadily. There is not particular limitation on the duration of electrolysis, T1, T2 and T3, but the duration of electrolysis performed at a small current density may not be so long. It is preferable for example, that T1 and T2 are independently about 0.5 to 3 minutes. T3 may be as short as T1 and T2. However, in this occasion, a further electrolysis should be performed for a longer period of time at a larger current density A4 than A3.

For example, the current density is set to 0.05 $mA/cm^2$ at the start of electrolysis to perform electrolysis for 1 minute, subsequently, the current density is set to 0.5 $mA/cm^2$ to perform electrolysis for 1 minute, and then the current density is finally set to 5 $mA/cm^2$ to continuously perform electrolysis for about 24 hours.

The concentration of sulfuric acid in the electrolytic bath should be controlled such that the concentration at the end of electrolysis is higher than that at the start of electrolysis. For example, the concentration of sulfuric acid in the electrolytic bath at the start of electrolysis is set to 10 to 100 g/L, and the concentration of sulfuric acid is varied throughout the electrolysis at an almost constant rate until the concentration finally reaches 30 to 120 g/L. It is preferable to control the concentration of sulfuric acid (concentration of hydrogen ions) such that the concentration at the end of electrolysis is about 1.2 to 1.7 times as large as that at the start of electrolysis. For example, at the start of electrolysis, the concentration of sulfuric acid in the electrolytic bath, the concentration of manganese sulfate, and the electrolysis temperature are set to 30 g/L, 50 g/L, and 95±2° C., respectively, and the concentration of sulfuric acid in the electrolytic bath is increased at an almost constant rate until 45 g/L is finally reached.

When electrolysis is started with a small current density at the start of electrolysis, the crystals will grow steadily. In addition, the gradual increase of the concentration of sulfuric acid in the electrolytic bath allows for formation of manganese dioxide in which there is a large amount of Mn vacancies but the size of crystallites is large (the crystallinity is high). In other words, the weight loss rate from 150 to 400° C. and the cumulative pore volume of pores with diameters of 3 to 5 nm in manganese dioxide can be controlled within a suitable range. On the other hand, under the electrolysis conditions that the concentration of sulfuric acid is high, in general, the occurrence of formation of crystal nuclei is high and a large number of small primary particles are formed, and therefore the crystallinity will be reduced.

When the cumulative pore volume X (cc/g) of pores with diameters of 3 to 5 nm in manganese dioxide is $X>0.011$, the crystallinity of the manganese dioxide is too low, and the heavy load discharge performance is not improved. Conversely, when $X \leq 0.011$, the crystallites are unlikely to expand sufficiently, and advantageously the polarization tends be suppressed. Despite that a smaller value X is preferred, when $X<0.005$, because of an extremely high crystallinity, the size of crystallites is excessively large, and the reaction area tends to decrease. For this reason, the value X should satisfy $0.005 \leq X \leq 0.011$.

When the weight loss rate Y (%) of manganese dioxide from 150 to 400° C. is $Y<3.4$, the amount of Mn vacancies in the manganese dioxide is considered to be too small. As such, the smooth migration of hydrogen ions in the solid phase is prevented. Because of this, the polarization during discharge is not reduced, and the heavy load discharge performance is not improved. In view of facilitating the migration of hydrogen ions in the solid phase, Y should satisfy $Y \leq 3.4$. On the other hand, despite that a larger value Y is preferred, when $Y>3.9$, the Mn vacancies are increased. Because of this, the amount of Mn to which the hydrogen ions can be bound during discharge tends to decrease. Moreover, when $Y>3.9$, the decomposition reaction of water readily occurs as the electrolysis proceeds. For this reason, the value Y should satisfy $3.4 \leq Y \leq 3.9$.

In addition, in view of the balance between the amount of Mn vacancies in the solid phase of manganese dioxide and the cumulative pore volume of pores with diameters of 3 to 5 nm as well as of the balance between the amount of Mn vacancies and the crystallinity, X and Y should satisfy $-16.7X+3.58 \leq Y \leq 66.7X+3.17$.

When the present invention is applied to an AA-size alkaline battery and the alkaline battery is subjected to an operation of performing a pattern discharge continuously for 10 cycles followed by an interval for 55 minutes, the pattern discharge including a discharge at 1.2 A for 2 seconds and a subsequent discharge at 0.5 A for 28 seconds, and the operation is repeated until the battery voltage reaches 1.05 V, the number of cycles of the pattern discharge can reach 140 cycles or more. It should be noted, however, if the number of cycles of the pattern discharge is 130 cycles or more, the heavy load discharge performance is considered to be sufficiently excellent.

Further, when the present invention is applied to an AA-size alkaline battery and the alkaline battery is subjected to an operation of performing a discharge at 0.25 A for 1 hour followed by an interval for 23 hours, and the operation is repeated until the battery voltage reaches 0.9 V, the total discharge duration can reach 9.2 hours or longer.

As an anode to be used for synthesizing electrolytic manganese dioxide, a titanium plate is preferably used; and as a cathode, a graphite plate or a platinum plate is preferably used. The distance between the anode and the cathode is set, for example, to 2 to 3 cm. It is efficient to perform electrolysis while the anode is sandwiched by a pair of cathodes. There is no particular limitation on the shape of the anode and the cathode, and for example, a square plate-like electrode can be used.

The synthesized manganese dioxide is roughly crushed, subsequently washed with warm water, thereafter finely crushed, then neutralized with an aqueous NaOH solution, and dried. The average particle size (median size) of the manganese dioxide is preferably 25 to 50 μm.

The manganese dioxide to be used in the alkaline battery of the present invention is not limited to electrolytic manganese dioxide. It is possible to use manganese dioxide obtained by chemical synthesis and natural manganese dioxide. Alternatively, it is possible to use one or two or more kinds of manganese dioxide in combination. Among these, electrolytic manganese dioxide is particularly preferred.

The crystal structure of manganese dioxide is preferably the one that is generally known as gamma type or epsilon type. However, the crystal structure of manganese dioxide is complicated, and currently, there is no strict definition thereof.

In obtaining the positive electrode, first, a positive electrode material mixture including: an electrolytic manganese dioxide having a cumulative pore volume of pores with diameters of 3 to 5 nm of X ($cm^3/g$) and a weight loss rate when heated from 150 to 400° C. of Y (%), X and Y satisfying $0.005 \leq X \leq 0.011$, $3.4 \leq Y \leq 3.9$, and $-16.7X+3.58 \leq Y \leq 66.7X+3.17$; and a conductive agent including graphite is prepared. The positive electrode material mixture, for the purpose of increasing its formability, may include a binder such as polyethylene. Thereafter, the positive electrode material mixture is formed into a hollow cylindrical pellet, whereby a positive electrode is obtained.

As the conductive agent for the positive electrode, an artificial graphite powder is preferably used, but natural graphite, expanded graphite, fibrous graphite, and the like can also be used. Alternatively, a carbon-based conductive agent other than graphite, such as acetylene black, carbon black, and Ketjen black may be used. The amount of graphite is preferably 4 to 8 parts by weight per 100 parts by weight of manganese dioxide.

As the negative electrode, a gelled negative electrode obtained by mixing, an alloy powder mainly composed of zinc, a gelling agent such as sodium polyacrylate, and an alkaline electrolyte is generally used. The negative electrode may include an organic or inorganic additive for improving the corrosion resistance and the stability of the alloy powder. Any alloy power may be used as long as it is stable and exhibits a negative potential in an aqueous alkaline solution and is capable of discharging. The alloy powder preferably contains at least one metal selected from indium, bismuth, aluminum, calcium, barium, magnesium, strontium, and the like.

For the separator, a non-woven fabric with alkali resistance including rayon fibers, vinylon fibers, pulp fibers, and the like is generally used, but a non-woven fabric or porous film made of a plastic resin may be used.

For the alkaline electrolyte, an aqueous solution containing potassium hydroxide (KOH) and zinc oxide (ZnO) is generally used. The suitable concentration of KOH in the alkaline electrolyte is 30 to 38% by weight. The suitable concentration of ZnO in the alkaline electrolyte is 1 to 5% by weight. The alkaline electrolyte may include at least one selected from sodium hydroxide, lithium hydroxide, and calcium hydroxide.

The alkaline battery can be obtained by inserting the positive electrode into a bottomed battery case having an opening, filling the hollow of the positive electrode with the negative electrode with a separator interposed therebetween, and sealing the opening of the battery case.

There is no particular limitation on the size and shape of the battery. The present invention is particularly effective in a D-size battery, a C-size battery, an AA-size battery, and an AAA-size battery, but the maximum effect can be obtained in an AA-size cylindrical battery. As an outer jacket of the battery, a nickel-plated case made of iron is generally used, but not limited thereto. The material of the case may be a plastic resin.

In view of achieving more noticeable effect of the present invention, it is preferable that a D-size battery, a C-size battery, an AA-size battery, and an AAA-size battery include manganese dioxide in an amount of 50 g or more, 21 g or more, 8.6 g or more, and 3.6 g or more, respectively, per one battery.

When above-described conditions are satisfied, an alkaline battery with drastically improved performance over conventional alkaline batteries can be provided.

In the following, a method for measuring the physical properties of manganese dioxide is described.

(A) Weight Loss Rate of Manganese Dioxide When Heated from 150 to 400° C.

As for the initial state of manganese dioxide before the measurement, the manganese dioxide is allowed to achieve a state of equilibrium in an environment of a temperature of 20 to 22° C. and a relative humidity of 40%.

The weight loss rate of manganese dioxide when heated can be measured by thermogravimetry. As the measurement apparatus, Thermo plus TG-DTA available from Rigaku Denki K.K. (Rigaku Corporation) can be used. As a standard sample, an alumina powder is used; and as a sample pan, a sample pan made of alumina is used. The sample pan with about 10 mg of manganese dioxide powder placed thereon is installed in the apparatus, and the temperature is raised from room temperature at a rate of 10° C./min while air is allowed to circulate at a rate of 100 mL/min. From the measurement data thus obtained, the difference in weight between at temperatures of 400° C. and 150° C. is determined. This difference in weight is divided by an initial weight of the manganese dioxide. The value thus obtained is referred to as a weight loss rate (before correction).

Blank measurement is performed using an empty sample pan without manganese dioxide placed thereon. The obtained data is used to correct the weight loss rate (before correction). The correction is necessary in order to correct the error of the balance in the apparatus due to heat.

(B) Cumulative Pore Volume of Pores with Diameter of 3 to 5 nm

For the measurement of a cumulative pore volume of pores with diameters of 3 to 5 nm, BJH (Barrett, Joyner and Halenda) method is used.

As a pretreatment prior to the measurement, a sample is dried under reduced pressure at 0.005 Torr for 1 hour at 120° C.

As a measurement apparatus, ASAP 2010 available from Micromeritics Instrument Corporation is used; and as an adsorption gas, nitrogen gas is used. The cumulative pore volume of pores with diameters of 3 to 5 nm included in manganese dioxide per unit weight of the manganese dioxide ($cm^3/g$) can be determined in the following manner from the data on pores when adsorbing or desorbing nitrogen.

Figure 2:
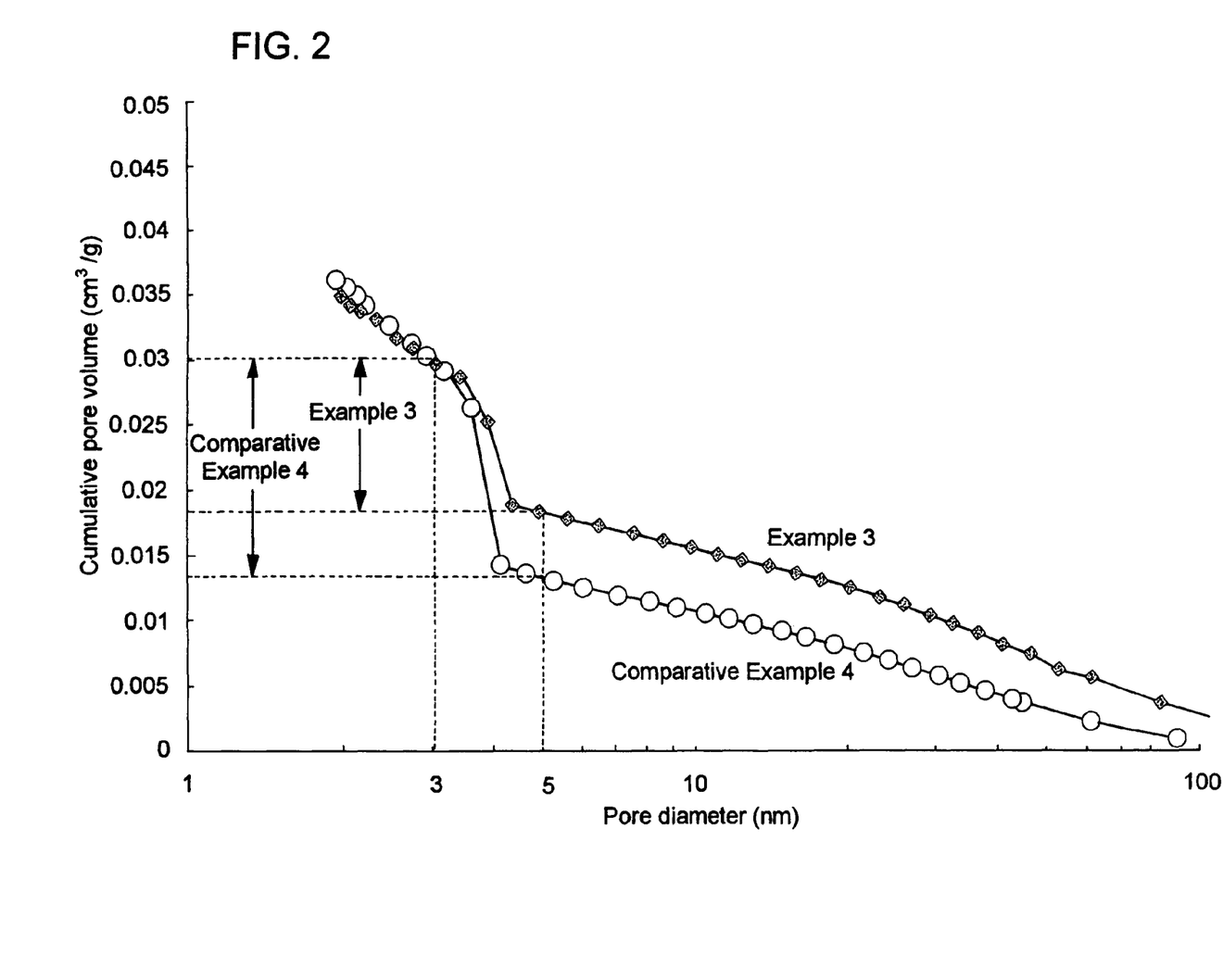
FIG. 2 is a graph of pore diameter distribution (cumulative pore volume) of manganese dioxides of Example 3 and Comparative Example 4.

Firstly, a graph of pore diameter distribution (a graph showing the relationship between a cumulative pore volume and a pore diameter) as shown in FIG. 2 is obtained. Secondly, the cumulative pore volume of pores of larger than 5 nm is subtracted from that of pores with diameter of pores of 3 nm or larger, to give a cumulative pore volume ($cm^3$) of pores with diameters of 3 nm or more and 5 nm or less. The absolute weight thus obtained is divided by an initial weight of the manganese dioxide (g). The cumulative pore volume of pores with diameters of 3 to 5 nm included in manganese dioxide per unit weight of the manganese dioxide ($cm^3/g$) is thus calculated.

In the following, the present invention is described in detail with reference to Examples, but the present invention is not limited thereto.

Example 1

(1) Synthesis of Electrolytic Manganese Dioxide

As the electrolytic bath, a 2-liter-volume round bottom separable flask was used; as the anode, a 1-mm-thick titanium plate of 5 cm×5 cm in size was used; and as the cathode, a 0.2-mm-thick platinum plate of 3 cm×3 cm in size was used. A pair of cathodes were disposed so as to sandwich the anode and to be each spaced apart from the anode by a distance of 2 cm.

As a solution of the electrolytic bath at the start of electrolysis, an aqueous solution containing sulfuric acid at a concentration of 30 g/L and manganese sulfate at a concentration of 50 g/L was used. As the manganese sulfate and the sulfuric acid, special grade reagent chemicals available from Kanto Chemical Co., Ltd. were used.

The concentration of hydrogen ions (concentration of sulfuric acid) was varied at an almost constant rate (at a rate of 1.4% per 1 hour) such that the concentration of sulfuric acid reached 40 g/L at the end of a 24-hour electrolysis, with a variation due to electrolysis reaction taken into consideration. In this Example, a solution of sulfuric acid, pure water, and manganese sulfate was supplied into the electrolytic bath at an almost constant rate.

The electrolysis temperature was set to 95±1° C. by adjusting the temperature of the electrolytic bath with a mantle heater. The duration of continuous electrolysis was set to 24 hours, and electrolysis was performed at a current density of 5 $mA/cm^2$, except for the first one minute from the start of the electrolysis during which electrolysis was performed at a current density of 0.05 $mA/cm^2$, and for the subsequent one minute during which electrolysis was performed at a current density of 0.5 $mA/cm^2$.

After the end of electrolysis, manganese dioxide was peeled off from the titanium plate, roughly crushed to a size of about 300 μm, washed in 60° C. ion exchange water, and neutralized by decantation until the pH of the aqueous solution reached 6. Subsequently, the resultant manganese dioxide was dried, and crushed to an average particle size of 40 μm. To 10 g of the powder thus obtained, 100 mL of ion exchange water was added, and to this solution, an aqueous 0.1 N sodium hydroxide solution was dropped until the pH of the supernatant of the solution reached 6. Thereafter, the powder was dried for 2 hours at 90° C., thereby to give manganese dioxide for used in a positive electrode.

Based on the above-described evaluation methods (A) and (B), the manganese dioxide thus obtained was subjected to thermogravimetry and pore measurement by BJH nitrogen adsorption method. As a result, the weight loss rate from 150 to 400° C. was 3.5%, and the cumulative pore volume of pores with diameters of 3 to 5 nm was 0.005 $cm^3/g$.

(2) Production of Positive Electrode

Electrolytic manganese dioxide and graphite were blended in a weight ratio of 94:6. Per 100 parts by weight of the resultant blend, 1 part by weight of an aqueous 35% by weight potassium hydroxide solution was added, and mixed in a mixer, thereby to give a positive electrode material mixture. This positive electrode material mixture was granulated into particles having an average particle size of about 150 μm in a roller compactor and a crusher. The particles thus obtained were press-molded into a hollow cylindrical pellet using dies, thereby to yield a positive electrode.

(3) Fabrication of Alkaline Battery

Figure 3:
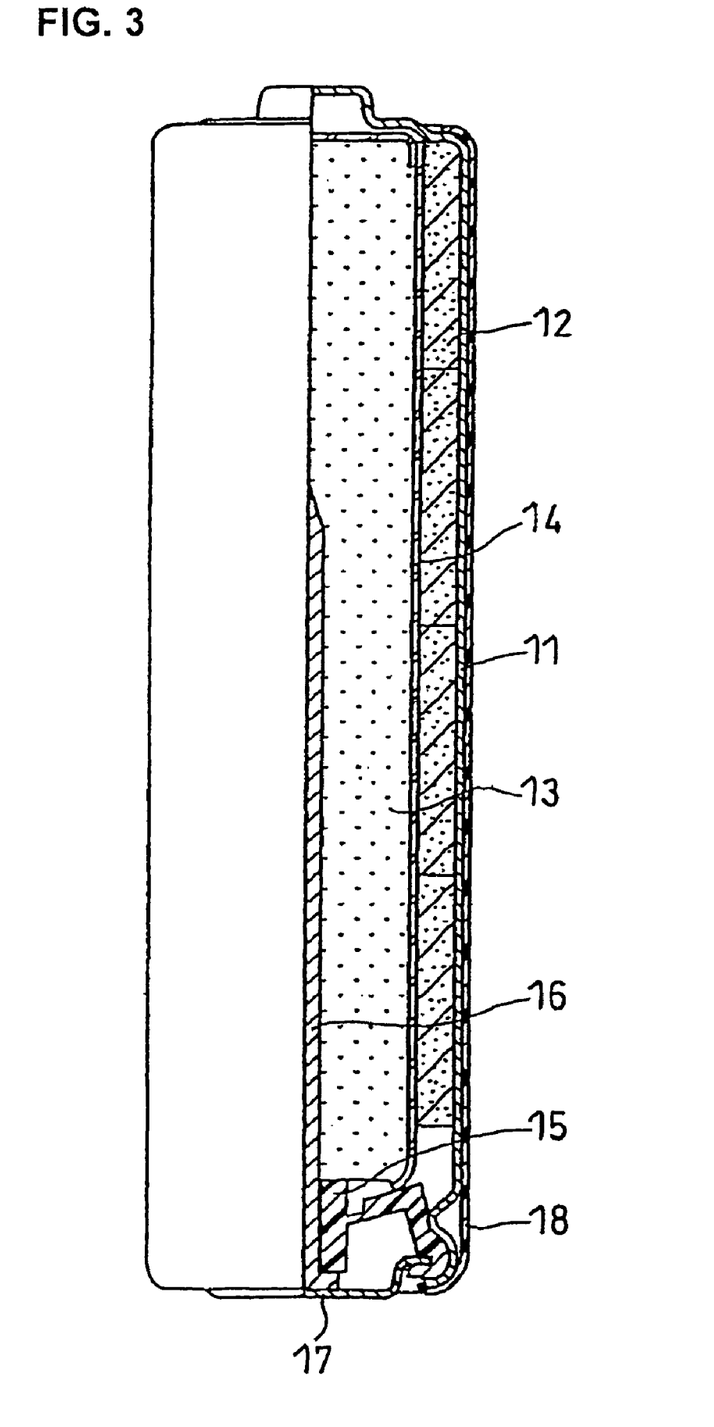
FIG. 3 is a partially sectioned front view of an example of an alkaline battery.

An AA-size cylindrical alkaline battery as shown in FIG. 3 was fabricated.

As a battery case 11 also serving as a positive electrode terminal, a case of nickel-plated can made of iron was used. A graphite coating film was formed on the inner surface of the battery case 11. A plurality of pellets of positive electrode material mixture were inserted into the battery case and used as a positive electrode 12. The positive electrode 12 was pressurized again to be brought into close contact with the inner wall of the battery case 11. The filling amount of the manganese dioxide per one battery was 10.24 g. In the hollow of the positive electrode 12, a bottomed cylindrical separator 14 was placed. Into the separator 14, a predetermined amount of aqueous 33% by weight potassium hydroxide solution was injected as an alkaline electrolyte in order to wet the positive electrode 12 and the separator 14. After a passage of a predetermined period of time after the injection of the alkaline electrolyte, a gelled negative electrode 13 was charged inside the separator 14.

The gelled negative electrode 13 had been prepared by mixing a zinc alloy powder serving as the negative electrode active material, sodium polyacrylate serving as the gelling agent, and the alkaline electrolyte (the aqueous 33% by weight potassium hydroxide solution) in a weight ratio of 64.06:0.74:35.2. Metals contained in the zinc alloy powder other than zinc were 0.02% by weight of indium, 0.005% by weight of bismuth, and 0.005% by weight of aluminum.

As the separator 14, a non-woven fabric mainly made of polyvinyl alcohol fibers and rayon fibers that are mixed was used.

In the center of the gelled negative electrode 13 charged inside the separator 14, a negative electrode current collector 16 provided with a gasket 15 made of resin and a bottom plate 17 also serving as a negative electrode terminal was inserted. A sealant was applied to the portion at which the gasket 15 and the negative electrode current collector 16 were in contact with each other, and then dried. Thereafter, the opening end of the battery case 11 was crimped onto the periphery of the bottom plate 17 with the edge of the gasket 15 interposed therebetween, thereby to seal the opening of the battery case 11. The outer surface of the battery case 11 was covered with an outer label 18. As the sealant, a mixture of 50 parts by weight of polyamide resin, 35 parts by weight of xylene, and 15 parts by weight of butanol was used.

Example 2

An electrolytic manganese dioxide was synthesized in the same manner as in Example 1 except that the concentration of sulfuric acid at the start of electrolysis was set to 25 g/L, the concentration of sulfuric acid at the end of electrolysis after the passage of 24 hours was set to 35 g/L, and an alkaline battery was fabricated using the electrolytic manganese dioxide thus synthesized. The concentration of hydrogen ions was varied at a rate of 1.7% per 1 hour.

The synthesized manganese dioxide was subjected to thermogravimetry and pore measurement by BJH nitrogen adsorption method. As a result, the weight loss rate from 150 to 400° C. was 3.4%, and the cumulative pore volume of pores with diameters of 3 to 5 nm was 0.011 cm$^3$/g.

Comparative Example 1

An electrolytic manganese dioxide was synthesized in the same manner as in Example 1 except that the concentration of sulfuric acid at the start of electrolysis was set to 75 g/L and the concentration of sulfuric acid at the end of electrolysis after the passage of 24 hours was set to 90 g/L, and an alkaline battery was fabricated using the electrolytic manganese dioxide thus synthesized. The concentration of hydrogen ions was varied at a rate of 0.8% per 1 hour.

The synthesized manganese dioxide was subjected to thermogravimetry and pore measurement by BJH nitrogen adsorption method. As a result, the weight loss rate from 150 to 400° C. was 4.2%, and the cumulative pore volume of pores with diameters of 3 to 5 nm was 0.015 cm$^3$/g.

Example 3

An electrolytic manganese dioxide was synthesized in the same manner as in Example 1 except that the concentration of sulfuric acid at the start of electrolysis was set to 55 g/L and the concentration of sulfuric acid at the end of electrolysis after the passage of 24 hours was set to 70 g/L, and an alkaline battery was fabricated using the electrolytic manganese dioxide thus synthesized. The concentration of hydrogen ions was varied at a rate of 1.1% per 1 hour.

The synthesized manganese dioxide was subjected to thermogravimetry and pore measurement by BJH nitrogen adsorption method. As a result, the weight loss rate from 150 to 400° C. was 3.7%, and the cumulative pore volume of pores with diameters of 3 to 5 nm was 0.011 cm$^3$/g. A graph of pore diameter distribution (cumulative pore volume) of the manganese dioxide of Example 3 is shown in FIG. 2.

Comparative Example 2

An electrolytic manganese dioxide was synthesized in the same manner as in Example 1 except that the concentration of sulfuric acid at the start of electrolysis was set to 35 g/L, the concentration of sulfuric acid at the end of electrolysis after the passage of 24 hours was set to 50 g/L, and the electrolysis temperature was set to 90° C., and an alkaline battery was fabricated using the electrolytic manganese dioxide thus synthesized. The concentration of hydrogen ions was varied at a rate of 1.8% per 1 hour.

The synthesized manganese dioxide was subjected to thermogravimetry and pore measurement by BJH nitrogen adsorption method. As a result, the weight loss rate from 150 to 400° C. was 3.3%, and the cumulative pore volume of pores with diameters of 3 to 5 nm was 0.012 cm$^3$/g.

Comparative Example 3

An electrolytic manganese dioxide was synthesized in the same manner as in Example 1 except that the concentration of sulfuric acid at the start of electrolysis was set to 60 g/L and the concentration of sulfuric acid at the end of electrolysis after the passage of 24 hours was set to 75 g/L, and an alkaline battery was fabricated using the electrolytic manganese dioxide thus synthesized. The concentration of hydrogen ions was varied at a rate of 1.0% per 1 hour.

The synthesized manganese dioxide was subjected to thermogravimetry and pore measurement by BJH nitrogen adsorption method. As a result, the weight loss rate from 150 to 400° C. was 4.0%, and the cumulative pore volume of pores with diameters of 3 to 5 nm was 0.013 cm$^3$/g.

Example 4

An electrolytic manganese dioxide was synthesized in the same manner as in Example 1 except that the concentration of sulfuric acid at the start of electrolysis was set to 45 g/L and the concentration of sulfuric acid at the end of electrolysis after the passage of 24 hours was set to 60 g/L, and an alkaline battery was fabricated using the electrolytic manganese dioxide thus synthesized. The concentration of hydrogen ions was varied at a rate of 1.4% per 1 hour.

The synthesized manganese dioxide was subjected to thermogravimetry and pore measurement by BJH nitrogen adsorption method. As a result, the weight loss rate from 150 to 400° C. was 3.7%, and the cumulative pore volume of pores with diameters of 3 to 5 nm was 0.008 cm$^3$/g.

Comparative Example 4

An alkaline battery was fabricated in the same manner as in Example 1 except that a commercially available electrolytic manganese dioxide for use in a battery (hereinafter referred to as manganese dioxide A) was used.

The manganese dioxide A was an electrolytic manganese dioxide obtained under the electrolysis conditions that the concentrations of manganese sulfate and sulfuric acid in the electrolytic bath were 50 g/L and 75 g/L, respectively, the electrolysis temperature was set to 98±1° C., the current density was 3.5 mA/cm$^2$. The concentration of sulfuric acid was almost constant throughout the electrolysis from the start to the end.

The manganese dioxide A was subjected to thermogravimetry and pore measurement by BJH nitrogen adsorption method. As a result, the weight loss rate from 150 to 400° C. was 3.3%, and the cumulative pore volume of pores with diameters of 3 to 5 nm was 0.017 cm$^3$/g. A graph of pore diameter distribution of the manganese dioxide A is shown in FIG. 2.

Comparative Example 5

An alkaline battery was fabricated in the same manner as in Example 1 except that a commercially available electrolytic manganese dioxide for use in a battery (hereinafter referred to as manganese dioxide B) was used.

The manganese dioxide B was an electrolytic manganese dioxide obtained under the electrolysis conditions that the concentrations of manganese sulfate and sulfuric acid in the electrolytic bath were 50 g/L and 50 g/L, respectively, the electrolysis temperature was set to 90±1° C., and the current density was 2 mA/cm$^2$. The concentration of sulfuric acid was almost constant throughout the electrolysis from the start to the end.

The manganese dioxide B was subjected to thermogravimetry and pore measurement by BJH nitrogen adsorption method. As a result, the weight loss rate from 150 to 400° C. was 3.2%, and the cumulative pore volume of pores with diameters of 3 to 5 nm was 0.014 cm$^3$/g.

Comparative Example 6

An alkaline battery was fabricated in the same manner as in Example 1 except that a commercially available electrolytic manganese dioxide for use in a battery (hereinafter referred to as manganese dioxide C) was used.

The manganese dioxide C was an electrolytic manganese dioxide obtained under the electrolysis conditions that the concentrations of manganese sulfate and sulfuric acid in the electrolytic bath were 50 g/L and 45 g/L, respectively, the electrolysis temperature was set to 90±1° C., and the current density was 3.5 mA/cm². The concentration of sulfuric acid was almost constant throughout the electrolysis from the start to the end.

The manganese dioxide C was subjected to thermogravimetry and pore measurement by BJH nitrogen adsorption method. As a result, the weight loss rate from 150 to 400° C. was 3.1%, and the cumulative pore volume of pores with diameters of 3 to 5 nm was 0.009 cm³/g.

Comparative Example 7

An electrolytic manganese dioxide was synthesized in the same manner as in Example 1 except that the concentration of sulfuric acid at the start of electrolysis was set to 50 g/L, the concentration of sulfuric acid was held constant until the end of electrolysis after the passage of 24 hours, and the electrolysis temperature was set to 85° C., and an alkaline battery was fabricated using the electrolytic manganese dioxide thus synthesized.

The synthesized manganese dioxide was subjected to thermogravimetry and pore measurement by BJH nitrogen adsorption method. As a result, the weight loss rate from 150 to 400° C. was 3.6%, and the cumulative pore volume of pores with diameters of 3 to 5 nm was 0.026 cm³/g.

Example 5

An electrolytic manganese dioxide was synthesized in the same manner as in Example 1 except that the concentration of sulfuric acid at the start of electrolysis was set to 60 g/L and the concentration of sulfuric acid at the end of electrolysis after the passage of 24 hours was set to 80 g/L, and an alkaline battery was fabricated using the electrolytic manganese dioxide thus synthesized. The concentration of hydrogen ions was varied at a rate of 1.1% per 1 hour.

The synthesized manganese dioxide was subjected to thermogravimetry and pore measurement by BJH nitrogen adsorption method. As a result, the weight loss rate from 150 to 400° C. was 3.9%, and the cumulative pore volume of pores with diameters of 3 to 5 nm was 0.011 cm³/g.

Example 6

An electrolytic manganese dioxide was synthesized in the same manner as in Example 1 except that the concentration of sulfuric acid at the start of electrolysis was set to 30 g/L, the concentration of sulfuric acid at the end of electrolysis after the passage of 24 hours was set to 40 g/L, and the electrolysis temperature was set to 90° C., and an alkaline battery was fabricated using the electrolytic manganese dioxide thus synthesized. The concentration of hydrogen ions was varied at a rate of 1.4% per 1 hour.

The synthesized manganese dioxide was subjected to thermogravimetry and pore measurement by BJH nitrogen adsorption method. As a result, the weight loss rate from 150 to 400° C. was 3.5%, and the cumulative pore volume of pores with diameters of 3 to 5 nm was 0.009 cm³/g.

(4) Evaluation of Battery

[Heavy Load Discharge Performance]

The batteries fabricated in Examples 1 to 6 and Comparative Examples 1 to 7 were allowed to stand for 10 days at room temperature, and then evaluated for heavy load discharge performance in an environment of 20° C. in the following manner.

An operation of performing a pattern discharge, which includes a discharge at 1.2 A for 2 seconds and a subsequent discharge at 0.5 A for 28 seconds, continuously for 10 cycles followed by an interval for 55 minutes was repeatedly performed, to determine the number of cycles of the foregoing pattern discharge repeated until the battery voltage reached 1.05 V. When the number of cycles thus obtained is 130 cycles or more, it can be concluded that the heavy load discharge performance is improved over conventional alkaline batteries.

[Intermediate Load Discharge Performance]

The batteries fabricated in Examples 1 to 6 and Comparative Examples 1 to 7 were allowed to stand for 10 days at room temperature, and then evaluated for intermediate load discharge performance in an environment of 20° C. in the following manner.

An operation of performing a discharge at 0.25 A for 1 hour followed by an interval for 23 hours was repeatedly performed, to determine the total discharge duration until the battery voltage reached 0.9 V. When the total discharge duration is 9.2 hours or longer, it can be concluded that the intermediate load discharge performance is improved over conventional alkaline batteries.

The electrolysis conditions are summarized in Table and the results are shown in Table 2.

TABLE 1

| | Start of electrolysis | | | | End of electrolysis | Varying rate of |
| --- | --- | --- | --- | --- | --- | --- |
| | $H_2SO_4$ concentration (g/L) | $MnSO_4$ concentration (g/L) | Current density (mA/cm²) | Electrolysis temperature (° C.) | $H_2SO_4$ concentration (g/L) | sulfuric acid concentration (%/h) |
| Ex. 1 | 30 | 50 | 5 | 95 | 40 | 1.4 |
| Ex. 2 | 25 | 50 | 5 | 95 | 35 | 1.7 |
| Com. Ex. 1 | 75 | 50 | 5 | 95 | 90 | 0.8 |
| Ex. 3 | 55 | 50 | 5 | 95 | 70 | 1.1 |
| Com. Ex. 2 | 35 | 50 | 5 | 90 | 50 | 1.8 |
| Com. Ex. 3 | 60 | 50 | 5 | 95 | 75 | 1.0 |
| Ex. 4 | 45 | 50 | 5 | 95 | 60 | 1.4 |

TABLE 1-continued

|  | Start of electrolysis ||||  End of electrolysis | Varying rate of |
| --- | --- | --- | --- | --- | --- | --- |
|  | $H_2SO_4$ concentration (g/L) | $MnSO_4$ concentration (g/L) | Current density (mA/cm$^2$) | Electrolysis temperature (° C.) | $H_2SO_4$ concentration (g/L) | sulfuric acid concentration (%/h) |
| Com. Ex. 4 | 75 | 50 | 3.5 | 98 | — | — |
| Com. Ex. 5 | 50 | 50 | 2 | 90 | — | — |
| Com. Ex. 6 | 45 | 50 | 3.5 | 90 | — | — |
| Com. Ex. 7 | 50 | 50 | 5 | 85 | — | — |
| Ex. 5 | 60 | 50 | 4 | 95 | 80 | 1.1 |
| Ex. 6 | 30 | 50 | 5 | 90 | 40 | 1.4 |

TABLE 2

|  | Weight loss rate (%) | Cumulative pore volume of pores with diameters of 3 to 5 nm (cm$^3$/g) | Heavy load discharge performance (Number of cycles) | Intermediate load discharge performance (hr) |
| --- | --- | --- | --- | --- |
| Ex. 1 | 3.5 | 0.005 | 135 | 9.4 |
| Ex. 2 | 3.4 | 0.011 | 136 | 9.2 |
| Com. Ex. 1 | 4.2 | 0.015 | 149 | 8.6 |
| Ex. 3 | 3.7 | 0.011 | 139 | 9.5 |
| Com. Ex. 2 | 3.3 | 0.012 | 130 | 8.8 |
| Com. Ex. 3 | 4.0 | 0.013 | 141 | 8.8 |
| Ex. 4 | 3.7 | 0.008 | 139 | 9.6 |
| Com. Ex. 4 | 3.3 | 0.017 | 120 | 8.5 |
| Com. Ex. 5 | 3.2 | 0.014 | 116 | 8.6 |
| Com. Ex. 6 | 3.1 | 0.009 | 111 | 8.5 |
| Com. Ex. 7 | 3.6 | 0.026 | 121 | 8.3 |
| Ex. 5 | 3.9 | 0.011 | 136 | 9.7 |
| Ex. 6 | 3.5 | 0.009 | 140 | 9.4 |

From the results in Tables 1 and 2, it is understood that in the cases where the cumulative pore volume X (cm$^3$/g) of pores with diameters of 3 to 5 nm in the manganese dioxide and the weight loss rate Y (%) of the manganese dioxide when heated from 150 to 400° C. satisfy $0.005 \leq X \leq 0.011$, $3.4 \leq Y \leq 3.9$, and $-16.7X+3.58 \leq Y \leq 66.7X+3.17$, excellent heavy load discharge performance is achieved.

In contrast, in the cases where the manganese dioxides of Comparative Examples 1 to 7, in which X and Y do not satisfy at least one of $0.005 \leq X \leq 0.011$, and $3.4 \leq Y \leq 3.9$, are used, the heavy load discharge performance is noticeably deteriorated. This is presumably due to an inappropriate balance between the amount of Mn vacancies in the solid phase of the manganese dioxide and the cumulative pore volume of pores with diameters of 3 to 5 nm, resulting in an insufficient reduction in the polarization during heavy load discharge.

Figure 4:
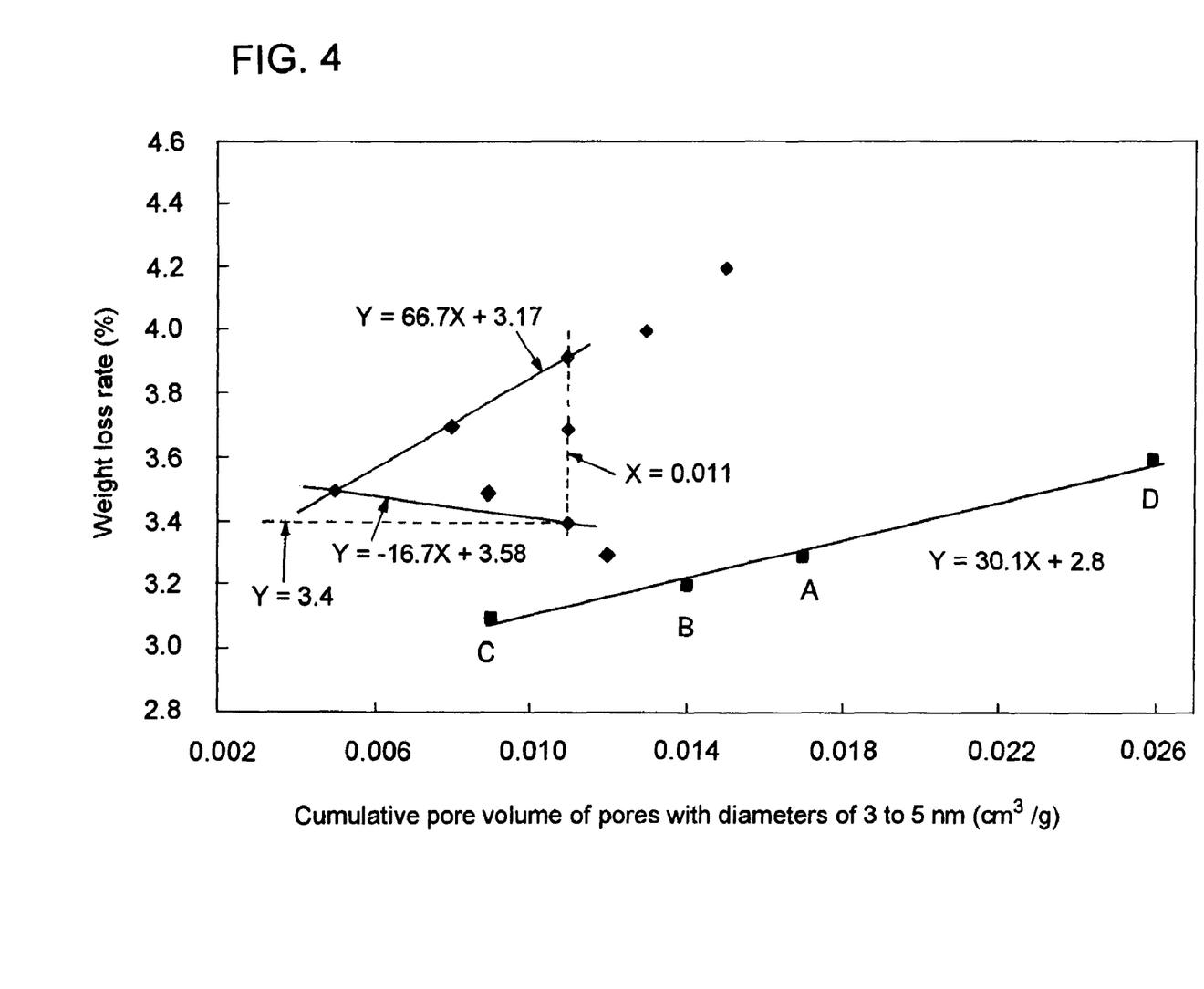
FIG. 4 is a graph showing the relationship between a cumulative pore volume X of pores with diameters of 3 to 5 nm and a weight loss rate Y from 150 to 400° C. in the manganese dioxides of Examples 1 to 6 and Comparative Examples 1 to 7.

FIG. 4 shows the relationship between a cumulative pore volume X of pores with diameters of 3 to 5 nm and a weight loss rate Y from 150 to 400° C. in the manganese dioxides of Examples 1 to 6 and Comparative Examples 1 to 7. From FIG. 4, it is found that the plotted points representing the conventional manganese dioxides A to D lie close to the straight line Y=30.1X+2.8.

In addition, from FIG. 4, it is understood that when manganese dioxide having physical properties falling within the triangular region formed by three dotted points representing Examples 1, 2 and 5 is used, an alkaline battery having improved heavy load discharge performance over conventional alkaline batteries can be provided. It is difficult to obtain such manganese dioxide by conventional production methods.

Moreover, from FIG. 4, it is found that the plotted points representing the electrolytic manganese dioxides of Examples 1, 4 and 5 lie close to the straight line Y=66.7X+3.17. It was difficult to produce an electrolytic manganese dioxide represented by a plotted point above this line. The synthesis of such manganese dioxide was attempted but failed because the increase in overvoltage during electrolysis is accelerated and the separation of manganese dioxide from the anode occurred.

It should be noted that a desired manganese dioxide was synthesized by way of improving the synthesis conditions for electrolytic manganese dioxide in the above Examples, but the production method of manganese dioxide is not limited to electrolysis.

The present invention provides an alkaline dry battery excellent in both heavy load discharge performance and intermediate load discharge performance and is widely applicable to an alkaline primary battery including manganese dioxide as a positive electrode active material.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An alkaline battery comprising a positive electrode, a negative electrode, a separator disposed between said positive electrode and said negative electrode; and an alkaline electrolyte, wherein
    said positive electrode includes manganese dioxide and graphite;
    the cumulative pore volume of pores with diameters of 3 to 5 nm in said manganese dioxide is X (cm$^3$/g), and
    the weight loss rate of said manganese dioxide when heated from 150 to 400° C. is Y (%),
    X and Y satisfying
    $0.005 \leq X \leq 0.011$,
    $3.4 \leq Y \leq 3.9$, and
    $-16.7X+3.58 \leq Y \leq 66.7X+3.17$;
    said negative electrode includes zinc; and
    said alkaline electrolyte includes an aqueous potassium hydroxide solution.

2. The alkaline battery in accordance with claim 1 having a size of AA, wherein when said alkaline battery is subjected to an operation of performing a pattern discharge continuously for 10 cycles followed by an interval for 55 minutes, the pattern discharge comprising a discharge at 1.2 A for 2 seconds and a subsequent discharge at 0.5 A for 28 seconds, and the operation is repeated until the battery voltage reaches 1.05 V, the number of cycles of the pattern discharge is 130 cycles or more.

3. The AA-size alkaline battery in accordance with claim 2, wherein when said alkaline battery is subjected to an operation of performing a discharge at 0.25 A for 1 hour followed by an interval for 23 hours, and the operation is repeated until the battery voltage reaches 0.9 V, the total discharge duration is 9.2 hours or longer.

* * * * *